United States Patent [19]
Fortune

[11] 3,919,524
[45] Nov. 11, 1975

[54] SOLDERING TIP AND LOCKING APPARATUS COMBINATION

[76] Inventor: William S. Fortune, 14250 Dearborn St., Panorama City, Calif. 91402

[22] Filed: Oct. 15, 1974

[21] Appl. No.: 514,402

Related U.S. Application Data

[62] Division of Ser. No. 388,928, Aug. 16, 1973, abandoned.

[52] U.S. Cl. .................. 219/238; 219/229; 228/55; 403/290
[51] Int. Cl.² .... H05B 1/00; B23K 3/02; B25G 3/24
[58] Field of Search .................. 219/221, 227–233, 219/236–240, 533; 228/51–55; 403/342, 289, 290, 377, 374

[56] References Cited
UNITED STATES PATENTS

| | | | |
|---|---|---|---|
| 2,098,581 | 11/1937 | Jones | 403/289 X |
| 2,279,324 | 4/1942 | Julien | 403/290 X |
| 2,665,365 | 1/1954 | Thomas | 219/227 X |
| 3,321,863 | 5/1967 | Maxam | 403/290 X |
| 3,498,652 | 3/1970 | Cass | 403/290 X |

FOREIGN PATENTS OR APPLICATIONS

| | | | |
|---|---|---|---|
| 828,004 | 2/1960 | United Kingdom | 219/238 |
| 734,850 | 8/1932 | France | 403/290 |
| 646,139 | 11/1950 | United Kingdom | 219/229 |

*Primary Examiner*—A. Bartis
*Attorney, Agent, or Firm*—Daniel T. Anderson

[57] ABSTRACT

A locking collar for removably securing the soldering tip to the smooth, constant diameter shaft of an electric soldering iron is disclosed which has a tapered thread engagement relationship with the rear, skirt portion of the tip member. The collar threads onto the rear of the tip member and compresses it securely against the soldering iron shaft. In one embodiment, the engagement is achieved by an eccentric, interference causing relation between the tip member, the soldering iron shaft, and the threaded collar.

2 Claims, 11 Drawing Figures

SOLDERING TIP AND LOCKING APPARATUS COMBINATION

This is a division of application Ser. No. 388,928, filed Aug. 16, 1973, now abandoned.

BACKGROUND OF INVENTION

1. Field of the Invention

The invention relates generally to apparatus for securely gripping a smooth shaft and more particularly to such apparatus for readily removably securing a member such as a soldering iron tip to the heated shaft of the electric soldering iron in good thermal energy flow relation therewith.

2. Brief Discussion of Background of the Invention

In the electric soldering iron field, it is an advantageous practice to manufacture the basic instrument with a smooth cylindrical heated shaft upon which may be mounted any of a plurality of replacement or different types, sizes, and shapes of soldering tips. Obviously it is desirable that the tip be securely mounted so that it will not rotate or slip axially during use. It also should be capable of providing maximum thermal conductivity between the heated shaft and the tip member.

Apparatus commonly utilized in the prior art is a simple, snugly fitting cap-like tip element which is slid over the shaft and held by the friction between the inner surface of the tip element and the outer surface of the shaft.

At best, this system requires close manufacturing tolerances in order to permit the sliding of the tip onto the shaft while providing enough friction to keep it emplaced as desired. And, at less than best, a satisfactory fit at one temperature is unsatisfactory at another; or, an acceptable fit with new components becomes non-acceptable after a short service life due to corrosion or wear on one or both surfaces.

Another popular prior art approach involves threading the tip onto the shaft; however, experience generally establishes that either the threaded portions seize unsatisfactory together or become loose with the thermal cycling of the system. Also it is undesirably expensive to manufacture all shafts and tips with the threading required by this approach.

Another prior art technique is to manufacture the tip with a definitely tight inner diameter, with respect to the heater shaft, and then provide a slot along the length of the skirt portion of the tip member to permit is installation over the shaft. Again, when the parts are new and clean, a satisfactory fit can be achieved; however, after wear, corrosion, and dimensional changes due to temperature cycling, the fit becomes unsatisfactory.

A partial solution to this latter disadvantage is to provide a clamp or clip over the slotted skirt to compress it onto the shaft. However, the clips or clamps heretofore available suffer the disadvantages of being bulky, awkward in use, or ineffective after a short life at the inherently high temperatures of such soldering iron components.

Accordingly, it is an object of the present invention to provide an improved soldering iron tip and locking apparatus combination which is not subject to these and other disadvantages and limitations of the prior art.

It is another object to provide such apparatus which is mechanically simple, rugged, easily and inexpensively manufactured, and exceedingly compact.

It is another object to provide such apparatus which is reliably simple and easy to use without tools.

It is another object to provide such apparatus which is functionally and aesthetically neat.

It is another object to provide such apparatus with which the tip element may be locked to the shaft at a variety of axial points therealong to provide a controlled thermal coupling between the heated shaft and the soldering tip.

It is another object to provide such apparatus which does not become loose or seize upon thermal cycling or long wear.

It is another object to provide such apparatus which may readily be caused to achieve a tighter, even more secure gripping when heated to service temperatures.

SUMMARY OF INVENTION

Briefly, these and other objects are achieved in accordance with the structural aspects of an example of the invention in which an internally threaded collar member of the character to be threaded onto the rear skirt portion of a longitudinally slotted tip element. At least one of the engaging surfaces is conically tapered whereby such threaded engagement causes a circumferential and radial constriction of the skirt resulting in a collet like gripping of the heater shaft by the skirt portion of the soldering tip. In an alternative embodiment, the collar member has a reduced inner diameter rear portion for closely circumscribing the heating shaft, while the forward portion is internally threaded as described above. The axis of the forward, threaded portion, however, is not colinear with the center of the reduced diameter rear opening. Consequently, as the threaded portion is screwed onto the skirt portion of the soldering tip, which need not be slotted in this example, the eccentric relation of the two internal surfaces of the locking collar cause a secure gripping of the shaft by the rear, reduced diameter opening of the collar member.

Further details of these and other novel features and their operation and cooperation as well as additional objects and advantages of the invention will become apparent and be best understood from a consideration of the following description taken in connection with the accompanying drawing which is provided by way of illustrative example only.

DETAILED DESCRIPTION OF PREFERRED EMBODIMENT

Figure 1:
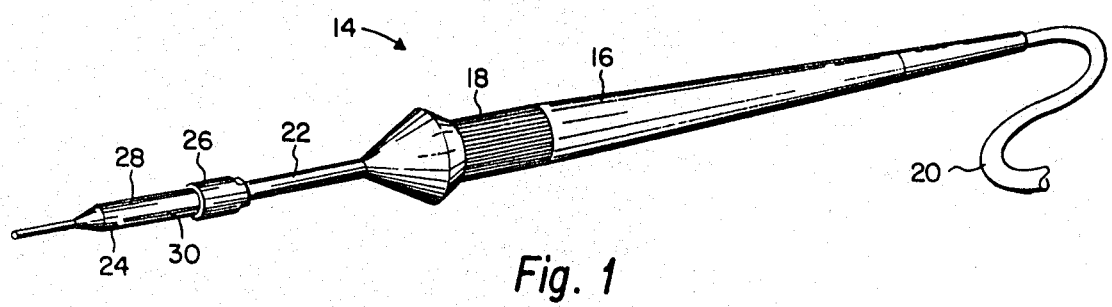
FIG. 1 is a perspective view of one example of an electric soldering instrument tip locking combination constructed in accordance with the principles of the present invention.

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show or discuss structural details of the apparatus in more detail than is necessary for a fundamental understanding of the invention. The description taken with the drawing will make it apparent to those skilled in the mechanical arts how the several forms of the invention may be embodied in practice. Specifically, the detailed showing is not to be taken as a limitation upon the scope of the invention which is defined by the appended claims forming, along with the drawing, a part of this specification.

In FIG. 1, an electric soldering iron 14 is illustrated having a body 16 with a forward, finger gripping portion 18. A power cord 20 extends in conventional manner from the rear of the instrument.

Projecting forwardly from the body 16 is the heating shaft 22 which, in this example is a smooth, right cylindrical form for housing the electric heating element, not shown. A removable, slip-on soldering tip 24 is shown emplaced over the forward end 25 of heating shaft 22 and is firmly secured thereto by a locking collar 26. In this example, the rear, skirt portion 28 of the tip 24 is slotted as indicated at 30 to permit the easy slip-on and off of the tip 24 as well as to permit the gripping or locking action described below.

Figure 2:
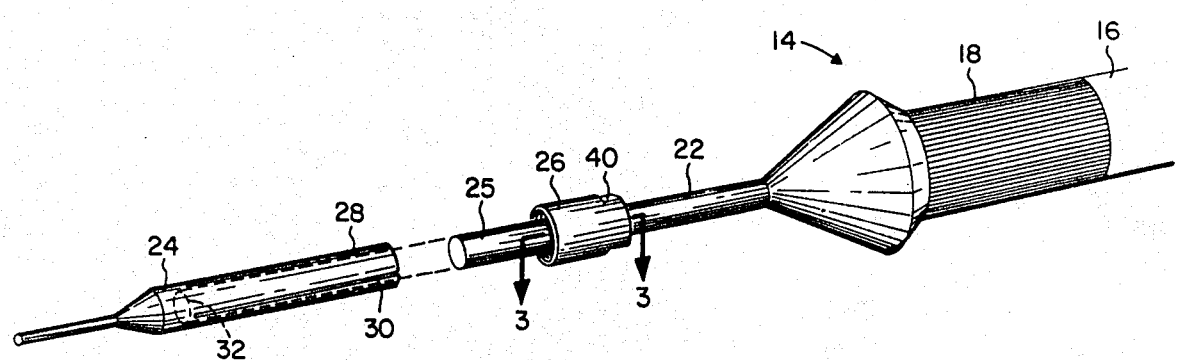
FIG. 2 is an enlarged view thereof illustrating the combination in a partially disassembled configuration.

Referring to FIG. 2, the soldering tip 24 is shown removed from the end 25 of the heating shaft 22; and the locking collar 26 is shown still loosely disposed on the shaft 22. It is to be noted, in this regard, that the heating rod or shaft receiving bore 32 of the tip 24 is of a diameter to fit loosely over the shaft and that, similarly, the inner diameter of the locking collar 26 is such as to slip loosely over the shaft. Because of these relationships, the manufacturing tolerances are advantageously large with the consequent advantages of low cost and long service life for all the parts. In addition, corrosion or deposits of scale or effects of wear and tear (e.g. nicks, dents, and scratches on the shaft 22) do not, in any respect, deleteriously affect the function or service life of the locking and locked members.

Figure 3:
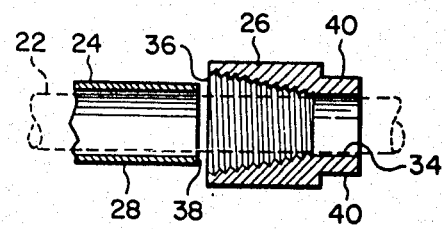
FIG. 3 is a longitudinal sectional view of the locking collar element of FIG. 2 taken along the section reference lines 3—3 thereof.

In FIG. 3, the sectional view of the locking collar 26 indicates a rear, reduced diameter portion 34 which, as noted supra, is slightly larger than that of the heating shaft 22. The forward end 36 of the collar has an inner diameter somewhat greater than the outer diameter of the rear skirt portion 28 of the soldering tip element 24. A major portion of the length of the collar 24 is internally threaded, as shown, with the threads tapering or converging toward the diameter of the portion 34.

The locking collar 26 is preferably fabricated from a hard and non corroding material such as, for example, stainless steel. Thus the threads, which must grip the chamfered, rear edge 38 of the tip 24, remain sharp and effective. Another advantage of stainless steel is that since it expands less with increase in temperature than does the tip when, as is typical, the latter is made basically of copper, the higher the temperature, the greater the effective grip of the tip onto the heater shaft.

Figure 4:
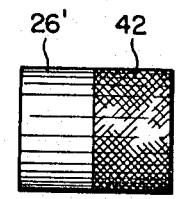
FIG. 4 is an elevational view illustrating an alternative external configuration of the locking collar of FIGS. 1–3.

In FIG. 3, the locking collar is shown as provided with a pair of flat surfaces 40 for threading the collar over the skirt portion 28, or, more accurately, the extreme rear edge 38 thereof, by grasping the collar with a simple tool such as gas pliers or the like. However, it has been found to be generally completely satisfactory to provide the outer surface of the collar 26 with a knurled surface 42, as shown in FIG. 4, for direct, finger operation.

In operation, when mounting a tip onto the heating rod, the collar element 26 is first slipped over the rod with the threaded portion exposed forwardly; then the soldering tip 24 is slipped over the rod and, typically, seated fully onto the rod; then the collar is moved forwardly until its threads engage the rear of the skirt portion of the tip; and then the collar is rotated to "climb" over the skirt end and compress it circumferentially and then radially against the outer surface of the heating rod. To remove or replace the tip, the process is reversed.

The threads, herein described as disposed on the internal surface of the collar element, may additionally or alternatively be formed on the outer surface of the rear, skirt portion of the soldering tip.

Figure 5:
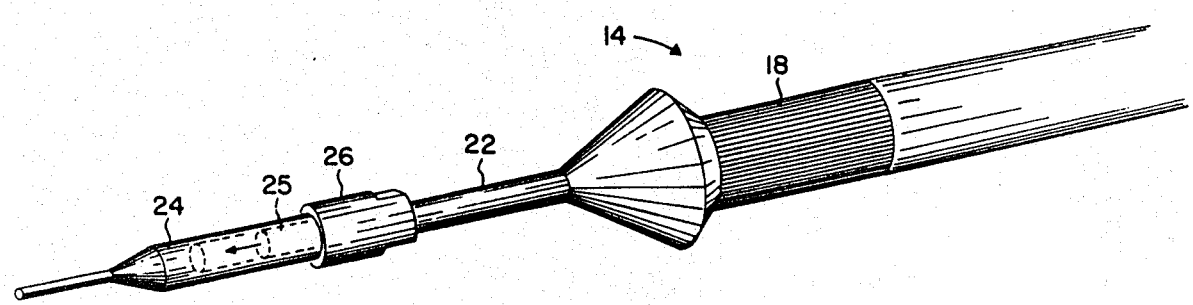
FIG. 5 is a perspective view of the apparatus of FIG. 1 illustrating a technique for achieving an adjustable magnitude of thermal coupling between the soldering tip and the heater shaft.

In FIG. 5, a technique for varying the thermal coupling to the tip is illustrated whereby a significant degree of temperature control of the tip can be achieved when desired. As indicated, the tip may be emplaced over the heater shaft without placing its forward end 25 fully into the bore 32 of the soldering tip 24. The disposition of the rod with respect to the end of the bore in the soldering tip may be viewed through the slot 30; and a calibrated legend, not shown, may be affixed to aid the operator in selecting the desired thermal coupling, and tip temperature, for a particular task.

Figure 6:
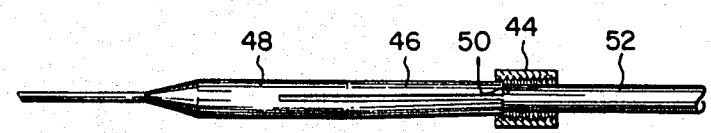
FIG. 6 is an elevational view partially in section of an alternative example of the invention in an unlocked configuration.

Referring to FIG. 6, an example of the invention is illustrated which includes a locking collar 44 having an internal, threaded surface which is essentially constant in diameter and may be end for end symmetrical. In this example, the tapered surface cooperation is provided by the rear, skirt portion 46 of the soldering tip 48 being tapered to a smaller diameter toward the rear end 50. In this example, the outer diameter of rear end 50 is somewhat less than the inner diameter of the threaded collar 44 whereby the latter may be threaded onto the slotted skirt to cause a gripping of the heating rod 52 by the rear portion of the skirt 46.

Figure 7:
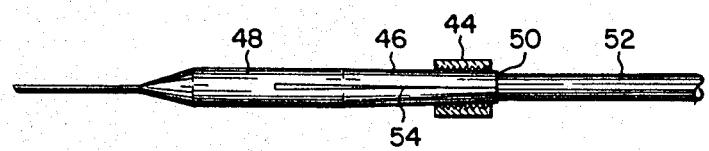
FIG. 7 is a view like that of FIG. 6 showing the apparatus in a locked configuration.

In FIG. 7, the collar 44 is shown screwed onto the skirt constricting it in a gripping relation about the heating rod 52, the constriction being indicated by the closing of the slot 54 in the skirt 46.

Figure 8:
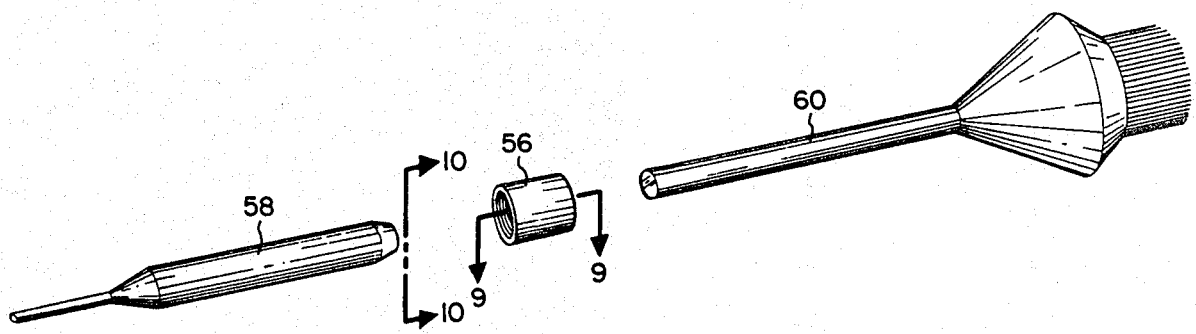
FIG. 8 is an exploded perspective view of an alternative example of the invention.
Figure 9:
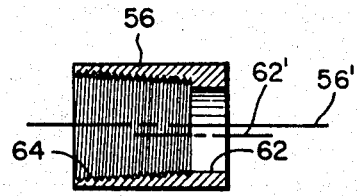
FIG. 9 is a longitudinal sectional view of the locking collar portion of FIG. 8 taken along the section reference lines 9–9 thereof.
Figure 10:
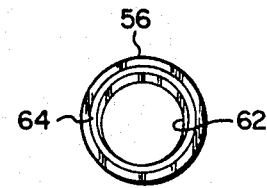
FIG. 10 is a frontal end elevational view of the structure of FIG. 9.

In the example of FIG. 8, the locking collar 56 is of the character to secure a soldering tip 58 which otherwise slips readily on and off the heater rod 60 and is not slotted. The collar 56 differs from those described in connection with FIGS. 1–5 in that the reduced diameter, rear opening 62 (having an axis 62') is off-center with respect to the axis 56' of the tapered threads 64. Again, the diameter of the opening 62 is slightly larger than that of the rod 60.

Figure 11:
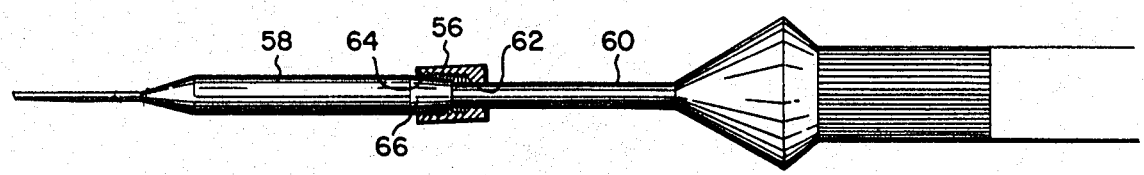
FIG. 11 is a side elevational view of the structure of FIG. 8 shown in an assembled configuration.

In operation, as shown in FIG. 11, when the collar 56 is threaded onto the nonslotted skirt portion 66 of the soldering tip 58, the collar tends to center itself with respect to the tip 58. As a result, there is a binding, or interference between the off-center opening 62, the heating shaft 60, and the skirt portion 66 of the soldering tip 58. As a result, the tip element is securely locked to the rod 60; and the locking achieves, at the same time, a good thermal coupling between the rod and the soldering tip.

There have thus been disclosed and described a number of examples of soldering iron tip and locking apparatus combination which exhibits the advantages and achieves the objects set forth hereinabove.

What is claimed is:

1. Soldering tip locking apparatus comprising:
   soldering tip element of the character having a forward tip end and a rear, hollow cylindrical skirt portion for closely fitting over an elongated cylindrical heating rod member; and
   collar element having a short, hollow, substantially cylindrical section with an inner diameter slightly greater than the outer diameter of the end of said rear, hollow skirt portion of said tip element,
   at least one of the outer surface of said skirt portion and the inner surface of said cylindrical section of said collar element being effectively tapered whereby axial displacement of said collar element over said skirt portion in the direction toward the said tip end of said tip element establishes contact between said collar element and said skirt portion, and whereby further such displacement establishes radially inwardly directed force upon said skirt portion, and
   at least one of said outer surface and said inner surface being threaded whereby said axial displacement is effected by rotational motion of said collar element about the axis of said heating rod member with respect to said tip element;
   said collar element further including a forward internally tapered portion, the inner diameter of which is essentially symmetrical about central axis of the collar and the taper of which diverges conically forwardly; and a rear portion having an opening, the diameter of which is slightly greater than the outer diameter of said heating rod member, the center of the opening of said rear portion of said collar element being disposed eccentrically with respect to said central axis of said collar element, said tapered portion having a front diameter greater than the outer diameter of said skirt portion and a rear diameter slightly greater than the diameter of said heating rod.

2. The invention according to claim 1 in which said tapered inner surface of said collar element is threaded to effect said further axial displacement thereof.

* * * * *